US010060776B2

(12) United States Patent
Inoue et al.

(10) Patent No.: US 10,060,776 B2
(45) Date of Patent: Aug. 28, 2018

(54) DIFFERENTIAL PRESSURE SENSOR, AND FILTRATION DEVICE USED THEREWITH

(71) Applicant: YAMASHIN-FILTER CORP., Kanagawa (JP)

(72) Inventors: Jiro Inoue, Kanagawa (JP); Nobuki Sasaki, Kanagwa (JP); Hiroshi Inaba, Kanagawa (JP); Nobuyuki Kitajima, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 0 days.

(21) Appl. No.: 15/782,956

(22) Filed: Oct. 13, 2017

(65) Prior Publication Data

US 2018/0113011 A1 Apr. 26, 2018

(30) Foreign Application Priority Data

Oct. 20, 2016 (JP) .................................. 2016-205661

(51) Int. Cl.
*G01F 1/50* (2006.01)
*G01F 1/46* (2006.01)
(Continued)

(52) U.S. Cl.
CPC ............. *G01F 1/50* (2013.01); *B01D 37/046* (2013.01); *G01F 1/366* (2013.01); *G01F 1/46* (2013.01)

(58) Field of Classification Search
None
See application file for complete search history.

(56) References Cited

U.S. PATENT DOCUMENTS 5,440,925 A * 8/1995 Padden ..................... G01F 1/90
73/1.19
7,130,750 B1 * 10/2006 Stevens ..................... G01F 1/24
702/64
(Continued)

FOREIGN PATENT DOCUMENTS

JP 2013-252512 A 12/2013

*Primary Examiner* — Jewel V Dowtin
(74) *Attorney, Agent, or Firm* — Nakanishi IP Associates, LLC (57) ABSTRACT

A spool, including a substantially cylindrical flange portion and a substantially cylindrical front end portion which is thinner than the flange portion and whose center axis is substantially coincident with the center axis of the flange portion, is provided in a manner capable of slidingly moving in a cavity formed in a casing. The flange portion is inserted in a first cavity which has a center axis substantially coincident with the center axis of the casing and which has an inner diameter that is substantially the same as the diameter of the flange portion in length. The front end portion is inserted in a second cavity which is formed with its center axis being substantially coincident with the center axis of the casing, and which has an inner diameter greater than the diameter of the front end portion and less than the inner diameter of the first cavity in length. The rotation limiting portion, which has a rod-like shape thinner than the front end portion and which is provided along the front end portion in a manner contacting the side surface of the front end portion, is inserted in a groove portion formed on the side face of the second cavity. When the flange portion slidingly moves along the first cavity, the rotation limiting portion slidingly moves along the groove portion.

8 Claims, 8 Drawing Sheets

(51) Int. Cl.
*B01D 37/04* (2006.01)
*G01F 1/36* (2006.01)

(56) References Cited

U.S. PATENT DOCUMENTS

| | | | |
|---|---|---|---|
| 7,493,829 B2* | 2/2009 | Inoue | G01F 1/24 73/861.57 |
| 2012/0060625 A1* | 3/2012 | Dietz | E21B 21/08 73/861.42 |

* cited by examiner

DIFFERENTIAL PRESSURE SENSOR, AND FILTRATION DEVICE USED THEREWITH

TECHNICAL FIELD

The present invention relates to a differential pressure sensor and a filtration device used therewith.

BACKGROUND ART

Patent Document 1 discloses that a differential pressure sensor which serves to sense a difference between the pressure inside an inner cylinder member and the pressure in a space between a storage tank and the filter element, is provided on an upper end support plate member with a filter element being incorporated in a hydraulic circuit.

CITATION LIST

Patent Literature

Patent Document 1: JP 2013-252512 A

In a cited Patent Document 1, a differential pressure sensor is used in which a reed switch is transversely disposed. However, such a conventional differential pressure sensor including a transversely-disposed reed switch is not likely to ensuring stable sensing of differential pressure. Hereinafter, explanation follows regarding this problem with reference to a drawing.

Figure 8:
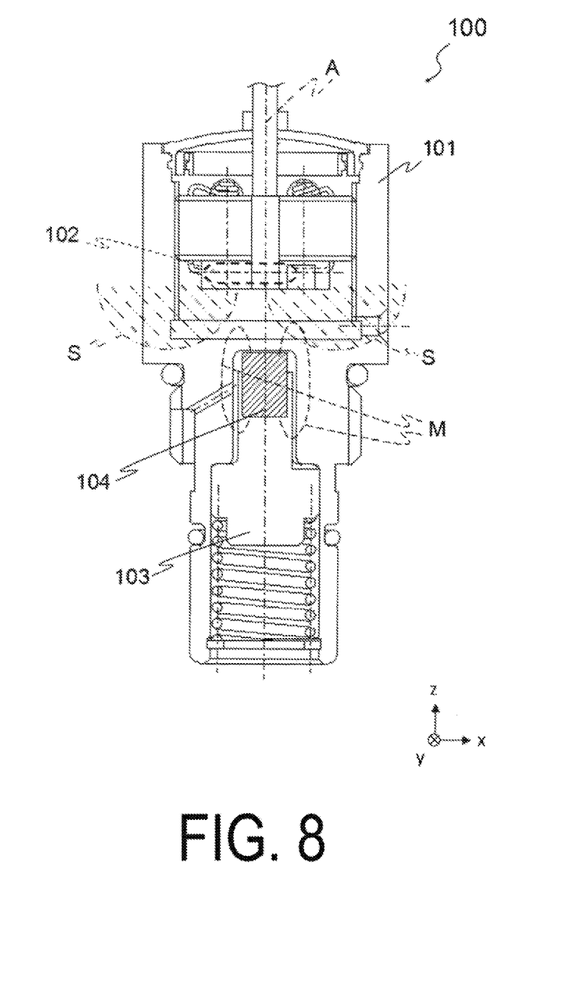
FIG. 8 is a diagram schematically illustrating a conventional differential pressure sensor 100.

FIG. 8 is a diagram schematically illustrating a conventional differential pressure sensor 100. FIG. 8 is a cross sectional view in which hatching of a plurality of components including a casing 101 is omitted for explanation of operations and the like. In the differential pressure sensor 100, a reed switch 102 and a spool 103 provided with a magnet 104 are disposed in the casing 101. The reed switch 102 is disposed along a plane (xy plane) perpendicular to the center axis A of the casing 101. In other words, the reed switch 102 is transversely disposed.

When two reed blades within the reed switch 102 are magnetized by a magnetic field of the magnet 104, the reed switch 102 is brought into a state in which an internal circuit is closed (hereafter, referred to as the "ON condition"). When the spool 103 separates from the reed switch 102, the reed switch 102 is changed from the ON condition to a state in which the internal circuit is open (hereinafter, referred to as the "OFF condition"). FIG. 8 schematically illustrates a situation in which the reed switch 102 is changed to the ON condition as a situation in which a line indicating a position of a magnetic field of predetermined strength (hereinafter, referred to as "a magnetic line of force M") of the magnet 104 intersects a range of an ON region S (see the chain double-dashed line and hatching in FIG. 8) of the reed switch 102.

The magnet 104 exhibits variations in magnetic force due to variability in a manufacturing step or the like. For example, in terms of the magnet 104, magnetic force on the right-side is greater than that on the left-side, as viewed in FIG. 8. Therefore, a position of the magnetic line of force M in the z direction varies with rotation of the magnet 104. Thus, the conventional differential pressure sensor 100 may cause a greater error in sensing of differential pressure, or in other words, is not likely to ensure stable sensing of differential pressure.

One aspect of the present invention has been made in view of the aforementioned circumstances, and an object of the invention is to provide a differential pressure sensor capable of ensuring stable sensing of differential pressure, and to provide a filtration device used therewith.

SUMMARY OF INVENTION

A differential pressure sensor according to one aspect of the present invention includes: a spool including a flange portion having a substantially cylindrical shape, and a front end portion having a substantially cylindrical shape, a center axis of the front end section being substantially coincident with a center axis of the flange portion, the front end portion being thinner than the flange portion; a rotation limiting portion having a rod-like shape thinner than the front end portion, the limiting portion being positioned along the front end portion in a manner contacting a side surface of the front end portion; a casing having a substantially cylindrical shape and including a cavity formed therein, the spool and the rotation limiting portion being disposed in the cavity and being capable of slidingly moving therein; a magnet provided at a distal end of the front end portion and opposing a bottom face of the cavity; a reed switch having a substantially cylindrical shape and positioned inside the casing to oppose the magnet with the bottom face of the cavity interposed between the reed switch and the magnet and a center axis of the read switch being substantially parallel with a center axis of the casing; and an elastic member for applying a force to the spool in a direction toward the bottom face of the cavity, wherein the cavity includes a first cavity having a center axis that is substantially coincident with a center axis of the casing, a second cavity on a distal end face of the first cavity and having a center axis that is substantially coincident with the center axis of the casing, and a groove portion formed on a side face of the second cavity, an inner diameter of the first cavity is substantially the same as a diameter of the flange portion in length; an inner diameter of the second cavity is substantially greater than a diameter of the front end portion and substantially less than the inner diameter of the first cavity in length, the flange portion is inserted in the first cavity, the distal end portion is inserted in the second cavity, and the rotation limiting portion is inserted in the groove portion, when the flange portion slidingly moves along the first cavity, the rotation limiting portion slidingly moves along the groove.

According to the differential pressure sensor of one aspect of the present invention, a spool, including a substantially cylindrical flange portion and a substantially cylindrical front end portion, which is thinner than the flange portion and whose center axis is substantially coincident with the center axis of the flange portion, is provided in a manner capable of slidingly moving in a cavity formed in the casing. The flange portion is inserted in a first cavity which has a center axis substantially coincident with the center axis of the casing and which has an inner diameter that is substantially the same as the diameter of the flange portion in length. The front end portion is inserted in a second cavity which is formed on a distal end face of the first cavity with its center axis being substantially coincident with the center axis of the casing, and which has an inner diameter greater than the diameter of the front end portion and less than the inner diameter of the first cavity in length. The rotation limiting portion, which has a rod-like shape thinner than the front end portion and which is positioned along the front end portion in a manner contacting a side surface of the front end portion, is inserted in the groove portion formed on the side face of the second cavity. When the flange portion slidingly moves along the first cavity, the rotation limiting portion slidingly moves along the groove portion (because the rotation limiting portion and the groove portion function as a rotation stop mechanism). Thus, the spool does not rotate with respect to the casing. This ensures stable sensing of differential pressure.

The differential pressure sensor further includes a pin, which has the rotation limiting portion and a substantially cylindrical head portion disposed at one end of the rotation limiting portion. The head portion is thicker than the rotation limiting portion. The flange portion is provided with a hole formed therein into which the head portion and the rotation limiting portion are inserted, and the elastic member may contact both an end face of the head portion and an end face of the flange portion. This allows the elastic member to push the end face of the head portion and to prevent the pin from falling out from the spool.

The rotation limiting portion may be formed of a material harder than the spool. This makes it possible for the rotation limiting portion to not be deformed even if the rotation limiting portion contacts the groove portion and some force is applied to the rotation limiting portion.

Furthermore, a filtration device of one aspect of the present invention is, for example, a filtration device provided with the aforementioned differential pressure sensor, in which the filtration device may be in communication with one of the first space and the second space at an upstream side of a filter, and in communication with the other at a downstream side of the filter.

Advantageous Effects of Invention

According to embodiments of the present invention, it is possible to ensure stable sensing of differential pressure.

DESCRIPTION OF EMBODIMENTS

Below, detailed description will be given according to embodiments of the present invention with reference to the drawings.

Figure 1:
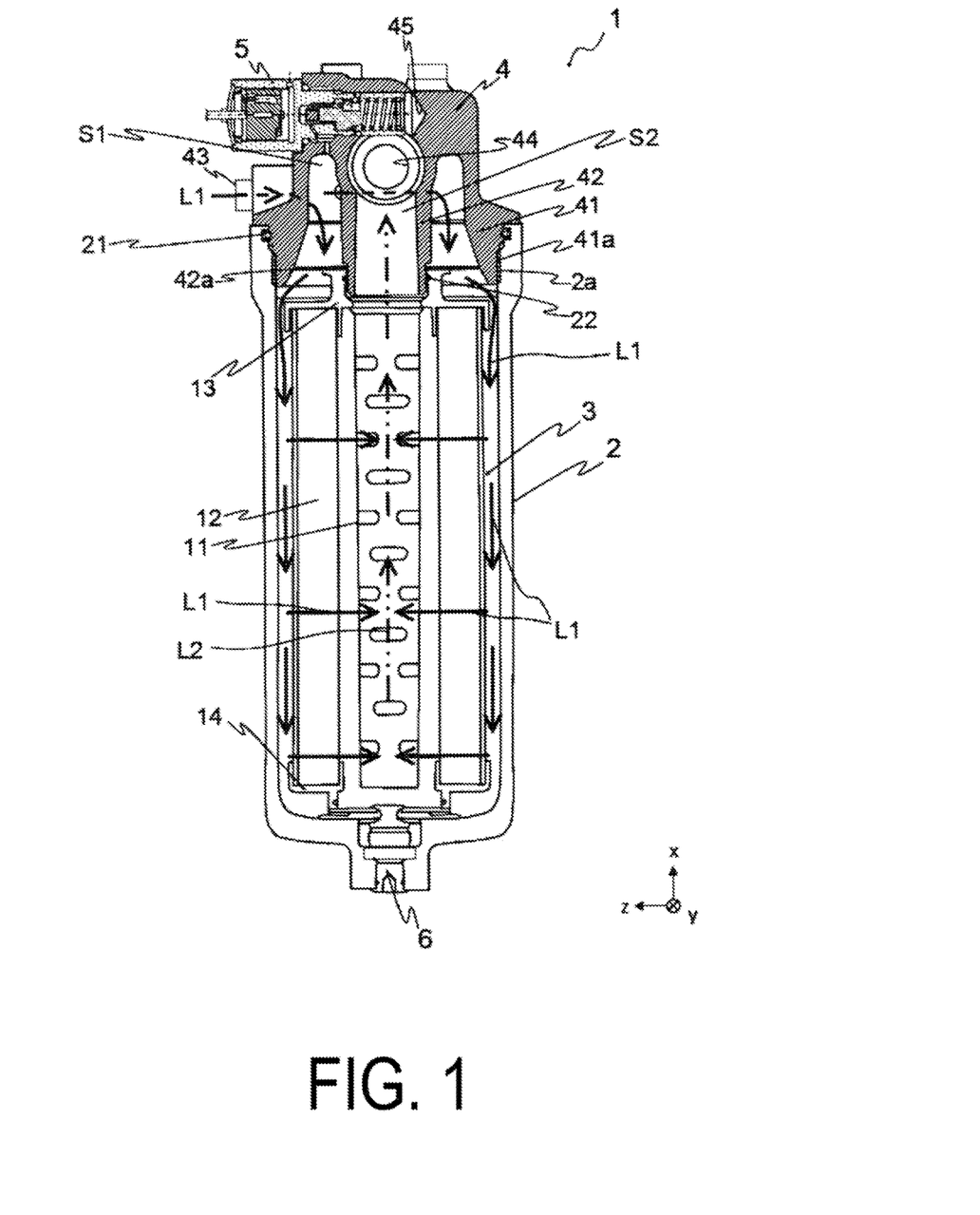
FIG. 1 is a schematic view of a filtration device 1 according to a first embodiment of the present invention.

FIG. 1 is a diagram schematically illustrating a filtration device 1. The filtration device 1 is intended for removing dust, etc., contained in a liquid such as oil, water, or the like, and is incorporated, for example, in a hydraulic circuit of heavy machinery or the like having a hydraulic actuator. In FIG. 1, hatching for indicating a cross section is partly omitted.

The filtration device 1 mainly includes a housing 2, a filter element 3, a head portion 4, an indicator 5, and a drain 6.

The housing 2 is a substantially cylindrical bottomed member, which is closed at one end and is open at the other end. The drain 6 is provided at the lower end of the housing 2. The drains 6 may be omitted.

The opening of the housing 2 is fitted to the head portion 4. When the housing 2 is fitted to the head portion 4, the filter element 3 is naturally attached to a central tube 42 (described in detail later) of the head portion 4. As a result, the filter element 3 is contained inside the housing 2.

The filter element 3 mainly includes an inner tube 11, a filtration member 12, and plates 13 and 14 respectively provided at opposite ends of the filtration member 12. The inner tube 11 is a substantially cylindrical hollow member with its opposite ends open, and is formed using a material with high corrosion resistance characteristics (e.g., resin or metal).

The filtration member 12 has a substantially hollow-cylindrical shape having a thickness in a radial direction. The filtration member 12 is formed by pleating a piece of sheet-like filter paper produced using synthetic resin, paper, or the like, and connecting both ends of the pleated filter paper sheet. Thus, a cylindrical roll is formed.

The plate 13 is provided at one end (the upper end as viewed in FIG. 1) of the filtration member 12, and the plate 14 is provided at the other end (the lower end as viewed in FIG. 1) thereof. Each of the plate 13 and the plate 14 is a substantially cylindrical bottomed member, and is formed using a material with high corrosion resistance characteristics.

The plate 13 is provided at the upper end of the filtration member 12. The central tube 42 (described in detail later) of the head portion 4 is inserted in the plate 13. A sealing member 22 (e.g., an O-ring) is disposed between the plate 13 and the central tube 42. The sealing member 22 provides sealing and prevents liquid from leaking out from between the plate 13 and the central tube 42. Furthermore, as the plate 13 is provided with the inner tube 11, when the central tube 42 is inserted in the plate 13, the internal space of the inner tube 11 communicates with the internal space of the central tube 42.

The head portion 4 mainly includes a body 41, the central tube 42, an inflow path 43, an outflow path 44, and a mounting cavity 45.

The body 41 is a substantially cylindrical bottomed member formed from a material with high corrosion resistance characteristics. An external thread portion 41a is formed on the outer periphery of the body 41 in the vicinity of its open end. The external thread portion 41a is threadedly engaged with an internal thread portion 2a formed on the inner periphery of the housing 2, whereby the housing 2 is mounted to the head portion 4, A sealing member 21 (e.g., an O-ring) is disposed between the housing 2 and the head portion 4. The sealing member 21 provides sealing and prevents liquid from leaking out from between the housing 2 and the head portion 4.

The central tube 42, which is a substantially cylindrical member, is integrally formed with the body 41. The central tube 42 extends from the bottom face of the body 41 at the center thereof along the same direction that the side surface of the body 41 protrudes. A stepped portion 42a to be fitted with the hollow portion of the plate 13 is formed on the outer peripheral surface of the central tube 42.

The inflow path 43 and the outflow path 44 are substantially tubular. A space S1 defined by the side surface of the body 41 and the central tube 42 (i.e., a space outside the central tube 42) is in communication with the inflow path 43. Furthermore, a space S2 inside the central tube 42 is in communication with the outflow path 44.

Among hydraulic oils, hydraulic oil to be filtered L1 is fed to the filtration device 1 via the inflow path 43. The hydraulic oil L1 (see the solid line arrow in FIG. 1) flows in the housing 2, is then filtered by the filtration member 12, and is made to flow therefrom into the interior of the inner tube 11. Furthermore, the hydraulic oil L2, which was filtered and made to flow into the interior of the inner tube 11 (see the two-dot chain line arrow in FIG. 1), is discharged through the outflow path 44 to the exterior of the filtration device 1.

The mounting cavity 45 is formed in the vicinity of the bottom face of the body 41. The indicator 5 is mounted in the mounting cavity 45.

The indicator 5 indicates whether an internal reed switch 53 (described in detail later) is ON or OFF by turning on or off a lamp (not illustrated). Mounting of the indicator 5 is described with reference to FIG. 2.

Figure 2:
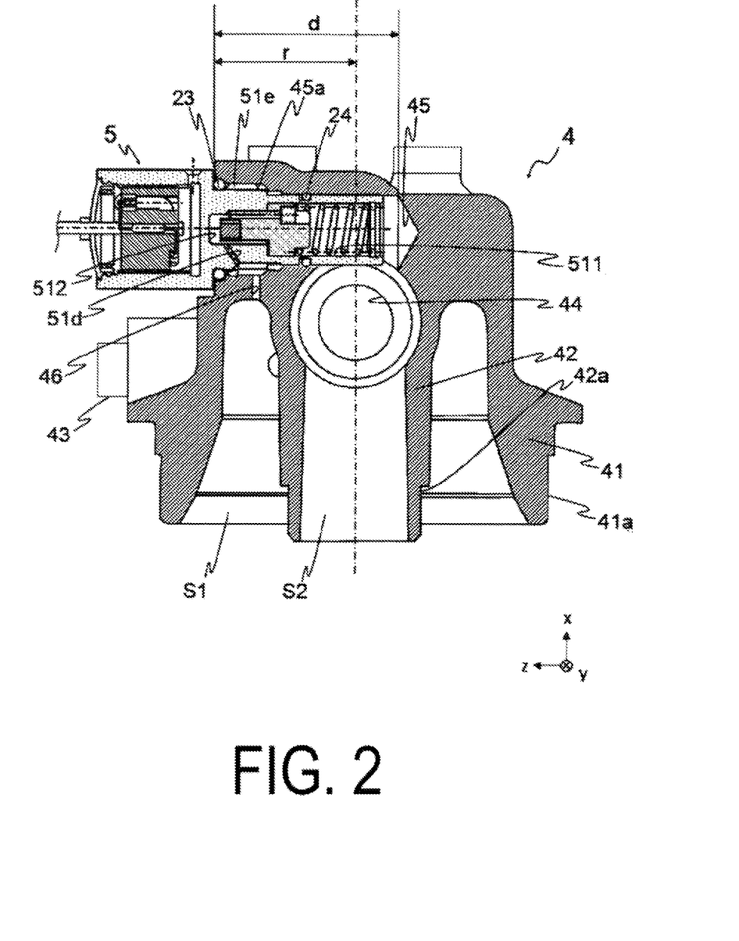
FIG. 2 is a cross-sectional view of a head portion 4.

FIG. 2 is a sectional view of the head portion 4 and the indicator 5 (hatching indicates a cross section is partly omitted). An internal thread portion 45a is formed on the side face of the mounting cavity 45. An external thread portion 51e (described in detail later) formed on the indicator 5 is threadedly engaged with the internal thread portion 45a, whereby the indicator 5 is mounted to the head portion 4.

Sealing members 23 and 24 (e.g., an O-rings) are disposed between the mounting cavity 45 and the indicator 5. The sealing members 23 and 24 provide sealing and prevents liquid from leaking out from between the mounting cavity 45 and the indicator 5.

The mounting cavity 45 opens into a side surface near the bottom face of the body 41, and has a depth d that is greater than or equal to the radius r of the bottom face of the body 41. Making the depth d of the mounting cavity 45 greater than or equal to the radius r allows the mounting cavity 45 in the vicinity of the bottom thereof to communicate with the outflow path 44, and in turn to communicate with the space S2. Since the indicator 5 is open at the bottom face, the space S2 is in communication with the first cavity 511 (described in detail later) in the indicator 5.

The internal thread portion 45a of the mounting cavity 45 is in communication with a space S1 via a hole 46. The space S1 is in communication with the second cavity 512 inside the indicator 5 via a hole 51d (described in detail later) formed in the indicator 5.

Figure 3:
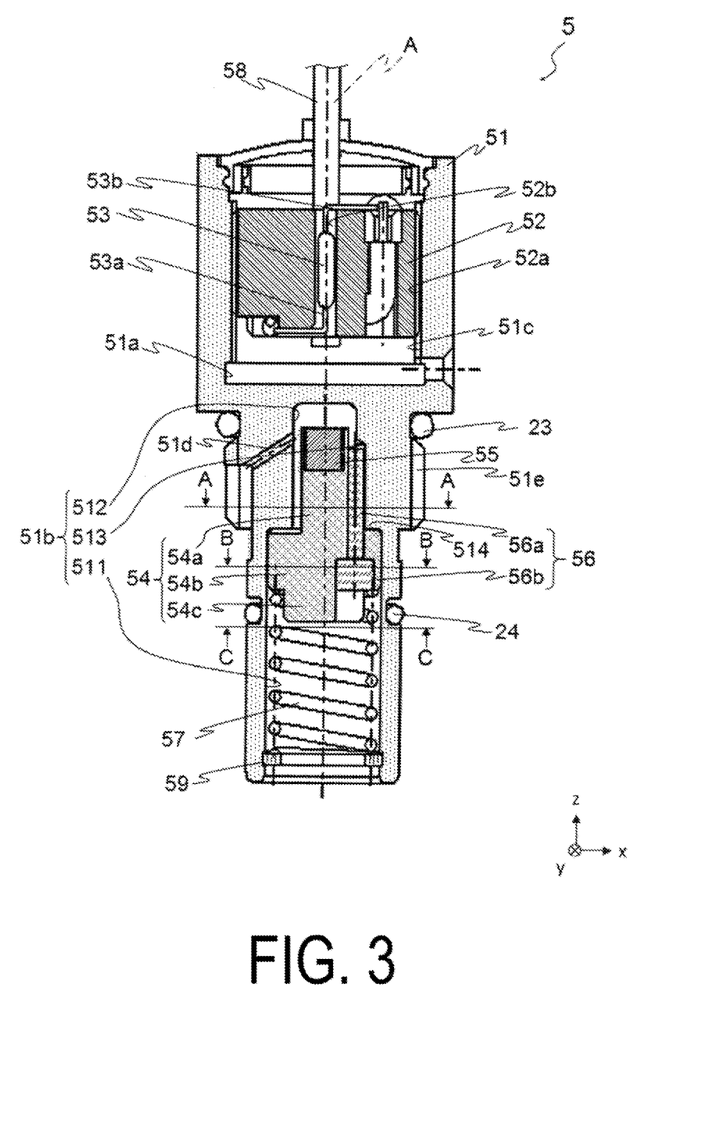
FIG. 3 is a cross-sectional view of an indicator 5.

Next, detailed explanation follows regarding the indicator 5. The indicator 5 represents a differential pressure sensor according to the present invention. FIG. 3 is a cross-sectional view of the indicator 5. In FIG. 3, hatching of a plurality of components is omitted for clarity of illustration.

The indicator 5 mainly includes a casing 51, a reed switch assembly 52, the reed switch 53, a spool 54, a magnet 55, a pin 56, and an elastic member 57.

The casing 51 has a substantially cylindrical shape and is provided with cavities 51a and 51b at the ends thereof, respectively. The cavities 51a and 51b each has a substantially cylindrical shape.

The cavity 51a is provided in the +z-side end of the casing 51. A reed switch assembly 52 is provided in the cavity 51a. An internal thread portion 51c is formed in the cavity 51a.

The reed switch assembly 52 has a substantially cylindrical shape, and an external thread portion 52a is formed therearound. The reed switch assembly 52 is mounted in a height-adjustable manner (position-adjustable in the z direction) in the cavity 51a by screwing the external thread portion 52a relative to the internal thread portion 51c.

A hole 52b is provided in the substantial center of the reed switch assembly 52. The reed switch 53 is placed in the hole 52b. In a state in which the reed switch assembly 52 is mounted inside the cavity 51a, the center axis of the hole 52b, i.e., the center axis of the reed switch 53, substantially coincides with the center axis A of the casing 51.

The reed switch 53 is a member in which two reeds (not illustrated) formed of ferromagnetic material are sealed in a glass tube at a predetermined spacing. When a magnetic field is applied to the reed switch 53, the two reeds contact each other, whereby a closed circuit state is provided. This causes the reed switch 53 to be turned to the ON condition. When the magnetic field is eliminated, the two reeds are moved away from each other by spring action, whereby an open circuit state is provided. This causes the reed switch 53 to be turned to the OFF condition. Since the reed switch 53 is well known, description thereof will be omitted.

The reed switch 53 has opposite ends from which reed blades 53a and 53b protrude, respectively. The reed blades 53a and 53b are each bent at substantially a right angle and are substantially perpendicular to the center axis A of the casing 51. The reed blades 53a and 53b are each electrically connected to a lead wire 58. The lead wire 58 connects the reed blades 53a and 53b to the lamp (not illustrated), etc.

The cavity 51b is provided in the −z-side end of the casing 51. The spool 54, the magnet 55, and the pin 56 are slidably disposed in the cavity 51b. The spool 54 is positioned on an opposite side to the reed switch 53 with the bottom face of the cavity 51b interposed therebetween.

Figure 4:
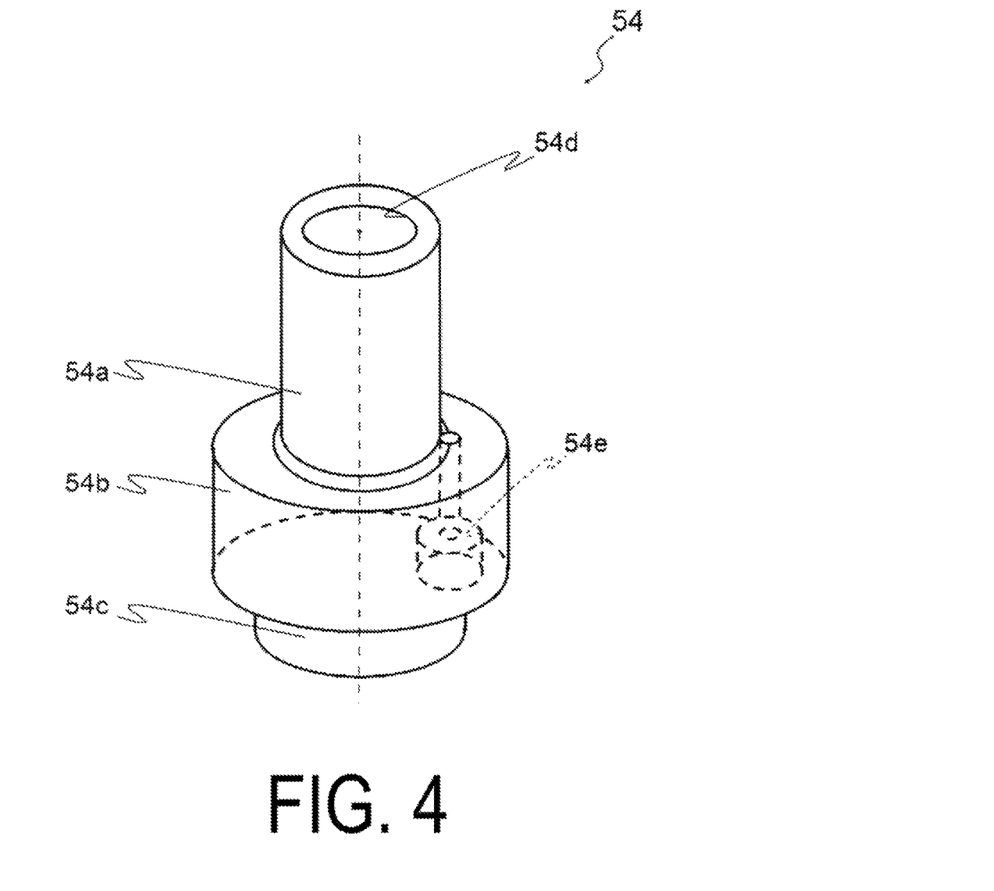
FIG. 4 is a perspective view schematically illustrating a spool 54.

The spool 54 is a substantially cylindrical member and is formed of brass and is easily slidable in the cavity 51b. FIG. 4 is a perspective view schematically illustrating the spool 54. The spool 54 mainly includes a front end portion 54a having a substantially cylindrical shape, a flange portion 54b having a substantially cylindrical shape, and a rear end portion 54c having a substantially cylindrical shape. The center axis of the front end portion 54a, the center axis of the flange portion 54b, and the center axis of the rear end portion 54c are substantially coincident.

The front end portion 54a and the rear end portion 54c are thinner than the flange portion 54b. A substantially cylindrical cavity 54d centered about the center axis is formed in the distal end of the front end portion 54a. A hole 54e into which the pin 56 is inserted is formed in the flange portion 54b.

The description will now return to FIG. 3. The magnet 55 is disposed in the cavity 54d. When the spool 54 is disposed in the cavity 51b, the magnet 55 is positioned to oppose the bottom face of the cavity 51b. The magnet 55 is also positioned to oppose the reed switch 53 with the bottom face of the cavity 51b interposed therebetween.

The spool 54 is provided with the pin 56. The pin 56 is formed of a material (e.g., stainless steel) harder than that of the spool 54. The pin 56 mainly includes a rod-like (rod shaped or substantially rod shaped) portion 56a, which is like a rod, thinner than the front end portion 54a (in this embodiment, like a rod having a substantially circular cross-section). and a substantially cylindrical head portion 56b thicker than the rod-like portion 56a, is provided at an end of the rod-like portion 56a. The rod-like portion 56a serves as a rotation limiting portion.

The pin 56 is press-fitted (e.g., lightly force-fitted) in the hole 54e (see FIG. 4), whereby the spool 54 and the pin 56 are integrated. In a state in which the spool 54 and the pin 56 are integrated, the rod-like portion 56a is positioned along the front end portion 54a in a manner contacting the side surface of the front end portion 54a, Furthermore, in the state in which the spool 54 and the pin 56 are integrated, the lower end face (on the −z side) of the head portion 56b is substantially flush with the lower end face of the flange portion 54b.

Next, the cavity 51b in which the spool 54 and the pin 56 are disposed is described. The cavity 51b mainly includes a first cavity 511, a second cavity 512, and a groove portion 513. The center axes of the first cavity 511 and the second cavity 512 are substantially coincident with the center axis A. The second cavity 512 is formed on a distal end face of the first cavity 511. The groove portion 513 is formed on the side face of the second cavity 512. The groove portion 513 is formed with one end face thereof opening in the bottom face 514 and the longitudinal direction thereof is along the center axis A.

The inner diameter of the first cavity 511 is substantially the same as the diameter of the flange portion 54b. The inner diameter of the second cavity 512 is greater than the diameter of the front end portion 54a, and is less than the inner diameter of the first cavity 511. The depth of the groove portion 513 is substantially the same as the radius of the rod-like portion 56a.

The flange portion 54b slidingly moves along the first cavity 511, The rod-like portion 56a slidingly moves along the groove portion 513.

Figure 5:
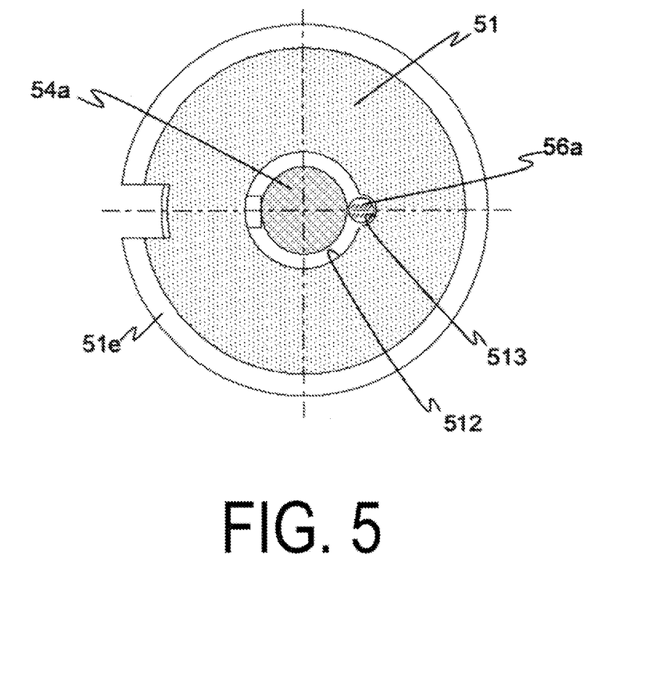
FIG. 5 is a cross-sectional view taken along line A-A in FIG. 3.
Figure 6:
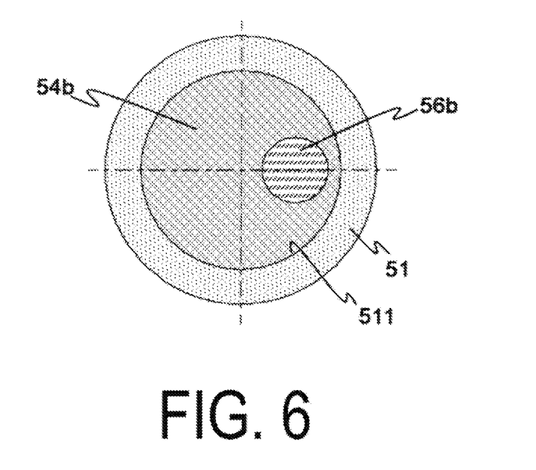
FIG. 6 is a cross-sectional view taken along line B-B in FIG. 3.

FIG. 5 is a cross-sectional view taken along line A-A in FIG. 3, and FIG. 6 is a cross-sectional view taken along line B-B in FIG. 3. A clearance gap between the outer peripheral surface of the flange portion 54b and the inner peripheral surface of the first cavity 511 is very slight (see FIG. 6) so that the flange portion 54b is capable of slidingly moving along the first cavity 511.

A clearance gap between the outer peripheral surface of the rod-like portion 56a and the inner peripheral surface of the groove portion 513 is very slight (see FIG. 5) so that the rod-like portion 56a is capable of moving along the groove portion 513. In contrast, a clearance gap between the outer peripheral surface of the front end portion 54a and the inner peripheral surface of the second cavity 512 is large. However, to prevent interference during sliding movement, the clearance gap between the outer peripheral surface of the rod-like portion 56a and the inner peripheral surface of the groove portion 513 is larger than the clearance gap between the outer peripheral surface of the flange portion 54b and the inner peripheral surface of the first cavity 511.

The description will now return to FIG. 3. The spool 54 divides the cavity 51b into a high-pressure side space and a low-pressure side space. The high pressure side space is defined by the second cavity 512 and the front end portion 54a, and the low-pressure side space is defined by the first cavity 511, the flange portion 54b, and the rear end portion 54c.

The high-pressure side space defined by the second cavity 512 and the +z-side end (the front end portion 54a) of the spool 54 communicates with the space S1 via the hole 51d provided in the casing 51 (see FIGS. 1 and 2). The low-pressure side space defined by the first cavity 511 and the −z-side end (the flange portion 54b and the rear end portion 54c) of the spool 54 communicates with the space S2 via the mounting cavity 45 and the outflow path 44 (see FIGS. 1 and 2).

The elastic member 57 is, for example, a coil spring, and one end of the elastic member 57 is provided on the spool 54, whereas the other end thereof is secured to the casing 51 via an E-ring 59. The elastic member 57 is restrained from radial movement by the rear end portion 54c. The elastic member 57 applies a force to the spool 54 in a direction from the first cavity 511 toward the second cavity 512 (a force in the +z direction). The spool 54 is capable of moving in the +z direction by the urging force of the elastic member 57 until the flange portion 54b contacts the bottom face 514 of the first cavity 511.

Figure 7:
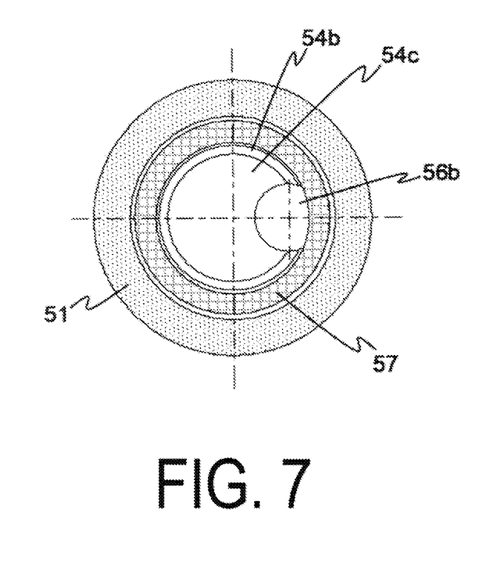
FIG. 7 is a cross-sectional view taken along line C-C in FIG. 3.

FIG. 7 is a cross-sectional view taken along line C-C in FIG. 3. In FIG. 7, the position of the elastic member 57 is indicated by a grid pattern. The elastic member 57 allows the end face of the head portion 56b to contact the end face of the flange portion 54b. The elastic member 57 pushes the end face of the head portion 56b and prevents the pin 56 from falling out from the spool 54.

Next, explanation follows regarding the operation of the indicator 5 with reference to FIG. 1. When clogging or the like of the filtration member 12 does not occur, and pressure difference between the space S1 and the space S2 is less than or equal to a threshold value, the spool 54 is at a position at which the reed switch 53 is turned to the ON state by the urging force of the elastic member 57.

In contrast, when the pressure in the space S1 increases because of clogging or the like of the filtration member 12, the spool 54 is moved in the −z direction (in the right direction as viewed in FIG. 1) against the urging force of the elastic member 57. Accordingly, the magnet 55 also moves in the −z direction.

When the flange portion 54b slidingly moves along the first cavity 511, the rod-like portion 56a moves along the groove portion 513. By making the rod-like portion 56a contact the groove portion 513, the movement of the spool 54 in the rotation direction is limited. In other words, the rod-like portion 56a and the groove portion 513 serve as a rotation stopping mechanism that prevents the spool 54 from rotating with respect to the casing 51. According to the embodiment, when the spool 54 rotates through about 5 degrees, the rod-like portion 56a contacts the groove portion 513.

When the pressure difference between the space S1 and the space S2 in the filtration device 1 is greater than or equal to a threshold value, in other words, when the distance between the reed switch 53 and the magnet 55 is greater than or equal to a threshold value, the two reeds are separated by resilience. Thus, an open circuit state is provided. This causes the reed switch 53 to be turned to the OFF condition. As the reed switch 53 is turned from the ON condition to the OFF condition, a lamp turned-off state and a lamp turned-on state are switched. This enables a user to easily know the matter that pressure difference between the space S1 and the space S2 in the filtration device 1 is greater than or equal to a threshold value, i.e., the filtration member 12 of the filter element 3 is clogged.

Then, when the filter element 3 is replaced and the pressure in the space S1 decreases, the spool 54 is moved in the ±z direction (in the left direction as viewed in FIG. 1) by the urging force of the elastic member 57. As a result, the reed switch 53 is turned to the ON condition again.

According to the embodiment, stable sensing of differential pressure is ensured by preventing rotation of the spool 54 (in turn, the magnet 55). When the magnet is rotatable, dispersion of the magnetization causes the reed switch to be turned to the ON condition or the OFF condition depending on the position in the rotation direction of the magnet. Thus, stable sensing of differential pressure may not be ensured. Such a situation prominently occurs when the differential pressure between the space S1 and the space S2 is near the threshold value.

Furthermore, at a circumferential position (a position on the xy plane) of the bent reed blade 53a (see FIG. 3), a pull-in value representing the sensitivity of the reed switch 53 is low (i.e., the sensitivity is good). Thus, when a portion of the magnet 55 at which a magnetic field is intense is coincident with the circumferential position of the bent reed blade 53a, the reed switch 53 is more likely to be turned to the ON condition even if the pressure difference between the space S1 and the space S2 is less than a threshold value, compared with otherwise.

In contrast, as in the present embodiment, when the center axis of the reed switch 53 is positioned in substantially parallel with the center axis A and the spool 54 is prevented from rotating with respect to the casing 51, the positional relationship between the reed blade 53a and the magnet 55 is maintained constant and the pressure difference between the space S1 and the space S2 when the reed switch 53 is changed from the ON condition to the OFF condition is made constant. In other words, stable sensing of differential pressure is ensured.

Furthermore, according to the embodiment, the rod-like portion 56a and the groove portion 513 serve as a rotation stopping mechanism, and the clearance gap between the outer peripheral surface of the front end portion 54a and the inner peripheral surface of the second cavity 512 is large. Thus, even if the inner peripheral surface of the second gap 512 decreases because of excessive screwing-in of the indicator 5 or the like when the indicator 5 is mounted in the head portion 4, the outer peripheral surface of the front end portion 54a does not contact the inner peripheral surface of the second cavity 512. Even if the rod-like portion 56a contacts the groove portion 513, the contact between the rod-like portion 56a and the groove 513 is line contact. Thus, contact area is small. Accordingly, it is possible to prevent a deficiency in which the spool 54 can no longer slidingly move.

Furthermore, according to the embodiment, the pin 56 is formed of a material harder than the spool 54. This makes it possible for the rod-like portion 56a not be deformed, even if the rod-like portion 56a contacts the groove portion 513 and some force is applied to the rod-like portion 56a. In addition, contacting the rod-like portion 56a and the front end portion 54a makes it possible for the front end portion 54a to not be deformed when assembling or the like.

In the embodiment, the space defined by the second cavity 512 and the front end portion 54a is the high-pressure side space that is in communication with the space S1, and the space defined by the first cavity 511, the flange portion 54b, and the rear end portion 54c is the low-pressure side space that is in communication with the space S2. However, the space defined by the second cavity 512 and the front end portion 54a may be a low-pressure side space, and the space defined by the first cavity 511, the flange portion 54b, and the rear end portion 54c is the high-pressure side space. In this case, an elastic member capable of applying a force in the −z direction to the spool 54 needs to be provided, in place of the elastic member 57 that applies a force in the +z direction to the spool 54.

Furthermore, in the embodiment, the center axis of the reed switch 53 is substantially coincident with the center axis A. However, the center axis of the reed switch 53 needs to be substantially parallel with the center axis A, and needs not necessarily be coincident with the center axis A. However, the configuration in which the center axis of the reed switch 53 is not coincident with the center axis A may be practiced only when the spool 54 and the cavity 51b provide the rotation limiting mechanism.

Furthermore, in the embodiment, the center axis of the reed switch 53 is coincident with the center axis of the magnet 55. However, the center axis of the reed switch 53 needs not necessarily be coincident with the center axis of the magnet 55. In order to allow the magnetic field of the magnet 55 to turn the reed switch 53 ON or OFF, the magnet 55 needs to be located on the center axis of the reed switch 53.

In this embodiment, the rod-like portion 56a is like a rod having a substantially circular cross-section. However, the shape of the rod-like portion 56a is not limited thereto. As long as the rod-like portion 56b is provided along the front end portion 54a in a manner contacting with the side surface of the front end portion 54a, the cross-section of the rod-like portion 56a may have a substantially rectangular shape or the like. In this embodiment, the spool 54 is provided with the pin 56. However, the head portion 56b may be omitted, and the front end portion 54a and the rod-like portion 56a may be integrally formed.

Embodiments of the invention have been described in detail with reference to the drawings; however, specific configurations are not limited to the embodiments, and changes in the design or the like are also included within a scope which does not depart from the gist of the invention. A person skilled in the art can easily modify, add, and convert each element in the above embodiments as appropriate.

Further, the term "substantially" in the present invention is not to be understood as merely being strictly the same, and is a concept that includes errors and deformations to an extent that does not result in loss in identity. For example, the expression "substantially parallel" is not limited to being strictly parallel, and represents a concept that includes an error of several degrees, for example. Further, for example, terms such as "parallel," "orthogonal," and "matching," include "substantially parallel," "substantially orthogonal," and "substantially matching,", and are not intended to strictly include only the parallel state, orthogonal state, and matching state. Furthermore, the meaning of the term "in the vicinity" in the present invention includes a region of a range (which can be determined as desired) near a position serving as a reference. For example, "in the vicinity of A" refers to a region of a range near A, and is a concept indicating that A may or may not be included.

REFERENCE SIGNS LIST

1 Filtration device
2 Housing
2a Internal thread portion
3 Filter element
4 Head portion
5 Indicator
6 Drain
11 Inner tube
12 Filtration member
13, 14 Plate
21, 22, 23, 24 Sealing member
41 Body
41a External thread portion
42 Central tube
42a Stepped portion
43 Inflow path
44 Outflow path
45 Mounting cavity
45a Internal thread portion
46 Hole
51 Casing
51a, 51b Cavity 51c Internal thread portion
51d Hole
51e External thread portion
52 Reed switch assembly
52a External thread portion
52b Hole
53 Reed switch
53a, 53b Reed blade
54 Spool
54a Front end portion
54b Flange portion
54c Rear end portion
54d Cavity
54e Hole
55 Magnet
56 Pin
56a Rod-like portion
56b Head portion
57 Elastic member
58 Lead wire
59 E-ring
100 Differential pressure sensor
101 Casing
102 Reed switch
103 Spool
104 Magnet
511 First cavity
512 Second cavity
513 Groove portion
514 Bottom face

The invention claimed is:

1. A differential pressure sensor comprising:
a spool including a flange portion having a substantially cylindrical shape, and a front end portion having a substantially cylindrical shape, a center axis of the front end section being substantially coincident with a center axis of the flange portion, and the front end portion being thinner than the flange portion;
a rotation limiting portion having a rod shape thinner than the front end portion, the limiting portion being positioned along the front end portion in a manner contacting a side surface of the front end portion;
a casing having a substantially cylindrical shape and including a cavity formed therein, the spool and the rotation limiting portion being disposed in the cavity and being capable of slidingly moving therein;
a magnet provided at a distal end of the front end portion and opposing a bottom face of the cavity;
a reed switch having a substantially cylindrical shape and positioned inside the casing to oppose the magnet with the bottom face of the cavity interposed between the reed switch and the magnet and a center axis of the read switch being substantially parallel with a center axis of the casing; and
an elastic member for applying a force to the spool in a direction toward the bottom face of the cavity,
wherein
the cavity includes a first cavity having a center axis substantially coincident with a center axis of the casing, a second cavity formed on a distal end face of the first cavity and having a center axis substantially coincident with the center axis of the casing, and a groove portion formed on a side face of the second cavity,
an inner diameter of the first cavity is substantially the same as a diameter of the flange portion in length;
an inner diameter of the second cavity is substantially greater than a diameter of the front end portion and substantially less than the inner diameter of the first cavity in length,
the flange portion is inserted in the first cavity, the distal end portion is inserted in the second cavity, and the rotation limiting portion is inserted in the groove portion,
when the flange portion slidingly moves along the first cavity, the rotation limiting portion slidingly moves along the groove.

2. The differential pressure sensor according to claim 1, further comprising a pin including: the rotation limiting portion; and a head portion disposed at one end of the rotation limiting portion, the head portion having a substantially cylindrical shape and being thicker than the rotation limiting portion,
wherein
the flange portion is provided with a hole formed therein into which the head portion and the rotation limiting portion are inserted,
the elastic member contact both an end face of the head portion and an end face of the flange portion.

3. The differential pressure sensor according to claim 1, wherein the rotation limiting portion is formed of a material harder than the spool.

4. The differential pressure sensor according to claim 2, wherein the rotation limiting portion is formed of a material harder than the spool.

5. A filtration device comprising the differential pressure sensor according to claim 1, wherein the filtration device is in communication with one of the first space and the second space at an upstream side, and is in communication with the other at a downstream side.

6. A filtration device comprising the differential pressure sensor according to claim 2, wherein the filtration device is in communication with one of the first space and the second space at an upstream side, and is in communication with the other at a downstream side.

7. A filtration device comprising the differential pressure sensor according to claim 3, wherein the filtration device is in communication with one of the first space and the second space at an upstream side, and is in communication with the other at a downstream side.

8. A filtration device comprising the differential pressure sensor according to claim 4, wherein the filtration device is in communication with one of the first space and the second space at an upstream side, and is in communication with the other at a downstream side.

* * * * *